US008767592B1

(12) United States Patent
Sojka et al.

(10) Patent No.: US 8,767,592 B1
(45) Date of Patent: Jul. 1, 2014

(54) SYSTEMS AND METHODS FOR CONFERENCING ENTERPRISE AND NON-ENTERPRISE CALLERS

(75) Inventors: Myron P Sojka, Logan, IA (US); Mark Steven Jarzynka, Omaha, NE (US); Srinivas Maganti, Andhra Pradesh (IN); Andrew Nelson, Omaha, NE (US)

(73) Assignee: West Corporation, Omaha, NE (US)

( * ) Notice: Subject to any disclaimer, the term of this patent is extended or adjusted under 35 U.S.C. 154(b) by 611 days.

(21) Appl. No.: 12/771,337

(22) Filed: Apr. 30, 2010

(51) Int. Cl.
*H04L 12/16* (2006.01)
*H04Q 11/00* (2006.01)

(52) U.S. Cl.
USPC ........... 370/260; 370/259; 370/261; 370/262; 370/263; 370/264; 370/265; 370/266; 370/267; 370/268; 370/269; 370/270; 370/271

(58) Field of Classification Search
None
See application file for complete search history.

(56) References Cited

U.S. PATENT DOCUMENTS

| 7,149,287 | B1* | 12/2006 | Burger et al. ............... 379/88.17 |
| 2002/0147777 | A1* | 10/2002 | Hackbarth et al. ............ 709/205 |
| 2004/0062210 | A1* | 4/2004 | Genter et al. .................. 370/260 |
| 2005/0111648 | A1* | 5/2005 | Roome ..................... 379/210.02 |
| 2008/0298278 | A1* | 12/2008 | Thakkar et al. ............... 370/260 |
| 2009/0279538 | A1* | 11/2009 | Merino Gonzalez et al. 370/352 |

* cited by examiner

*Primary Examiner* — Hassan Phillips
*Assistant Examiner* — Lonnie Sweet (57) ABSTRACT

The illustrative embodiments described herein provide improved systems and methods for conferencing enterprise and non-enterprise callers. In one embodiment, a method includes receiving a first call initiated by an enterprise caller at an enterprise, communicating with an enterprise media server to initiate a tributary conference on the enterprise media server, joining the enterprise caller to the tributary conference such that the enterprise caller is in data communication with the tributary conference, receiving a second call initiated by a non-enterprise caller via a public switched telephone network, interfacing the non-enterprise caller with a data center media server, creating a home conference on the data center media center, joining the second call to the home conference, and interfacing the home conference on the data center media server to the tributary conference on the enterprise media server to form a linked conference between the enterprise caller and the non-enterprise caller.

19 Claims, 8 Drawing Sheets

SYSTEMS AND METHODS FOR CONFERENCING ENTERPRISE AND NON-ENTERPRISE CALLERS

BACKGROUND

1. Field

The present invention relates generally to systems and methods for conferencing callers. More particularly, the present invention relates to conferencing enterprise and non-enterprise callers.

2. Description of the Related Art

Communication between two or more parties is often achieved through conferencing. A conference allows participants to exchange audio, video, and other media-related data with one another, often in real time, and does not require the conference participants to be in the same physical location during the exchange. In some cases, a conference may include participants that are located both inside and outside of an enterprise. However, a conference that includes enterprise and non-enterprise callers can often waste valuable computing resources, or cause devices to be deployed at the enterprise that are unnecessary for the establishment of a conference. Furthermore, current systems may fail to effectively link conferences located on and off of the enterprise.

SUMMARY

The illustrative embodiments described herein are directed to a data processing system and, in particular, to systems and methods for conferencing enterprise and non-enterprise callers. In one embodiment, a method includes receiving a first call initiated by an enterprise caller at an enterprise, communicating with an enterprise media server to initiate a tributary conference on the enterprise media server, joining the enterprise caller to the tributary conference such that the enterprise caller is in data communication with the tributary conference, receiving a second call initiated by a non-enterprise caller via a public switched telephone network, interfacing the non-enterprise caller with a data center media server, creating a home conference on the data center media center, joining the second call to the home conference on the data center media center, and interfacing the home conference on the data center media server to the tributary conference on the enterprise media server to form a linked conference between the enterprise caller and the non-enterprise caller.

In another embodiment, a method includes establishing a tributary conference on an enterprise media server. The tributary conference is in data communication with an enterprise caller at an enterprise in response to a first call from the enterprise caller. The method also includes receiving a second call initiated by a non-enterprise caller, interfacing the non-enterprise caller with a data center media server, creating a home conference on the data center media center, joining the second call to the home conference on the data center media center, and interfacing the home conference on the data center media server to the tributary conference on the enterprise media server to form a linked conference between the enterprise caller and the non-enterprise caller.

In another embodiment, a conferencing system includes an enterprise sub-system. The enterprise sub-system includes a first communication device to initiate a first call from an enterprise caller, and an enterprise media server to host a tributary conference in data communication with the first communication device. The conferencing system also includes a data center sub-system at a separate location from the enterprise sub-system. The data center sub-system includes a gateway to receive a second call initiated by a non-enterprise caller via a public switched telephone network. The non-enterprise caller uses a second communication device to initiate the second call. The data center sub-system also includes a data center media server to host a home conference in data communication with the second communication device, and an application server to interface the home conference on the data center media server with the tributary conference on the enterprise media server.

DETAILED DESCRIPTION

Figure 1:
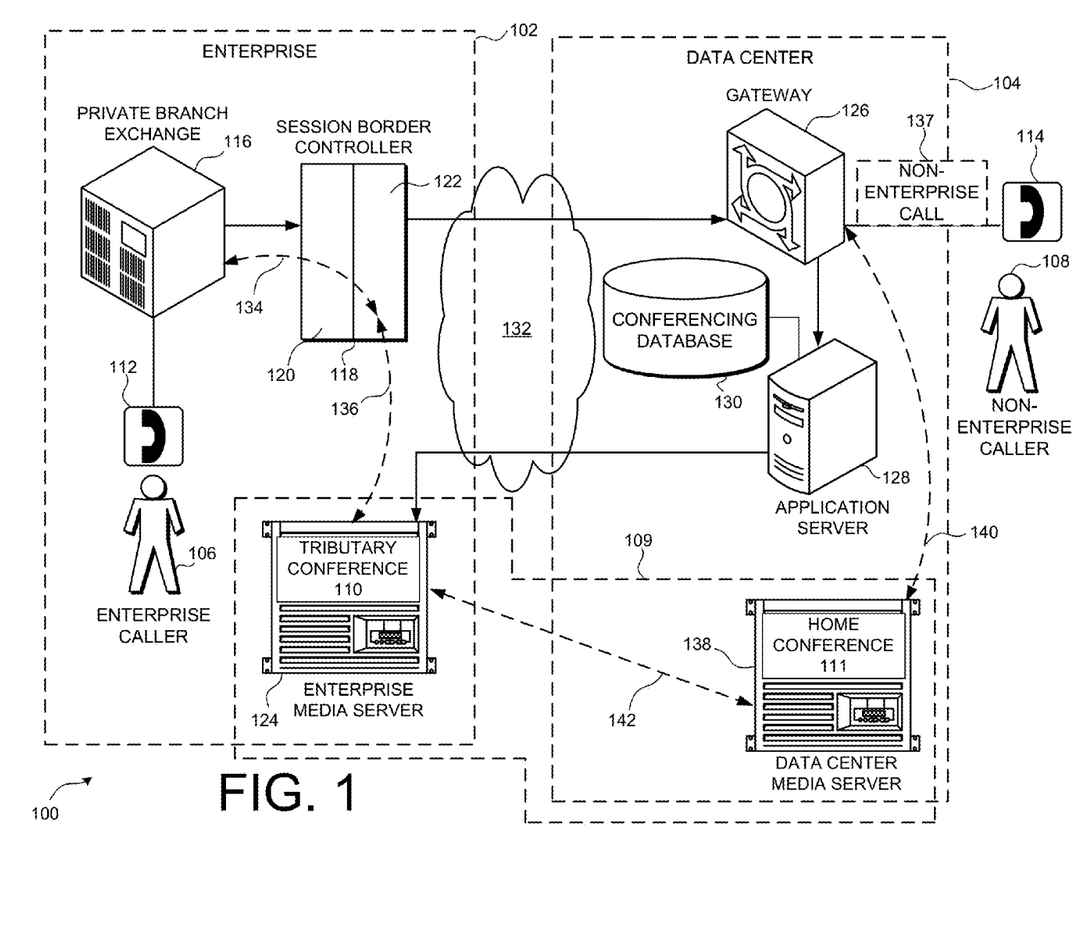
FIG. 1 is a schematic, pictorial representation of a conferencing system according to an illustrative embodiment.

Referring to FIG. 1, an illustrative embodiment of a conferencing system 100 includes an enterprise sub-system, or enterprise, 102 and a data center sub-system, or data center, 104 in data communication with one another. The enterprise 102 is any entity having two or more communication devices that are capable of communicating with one another. For example, the enterprise 102 may be an organization, such as a business or government unit, that is interconnected using a local area network (LAN), including a personal area network (PAN), a campus area network (CAN), a metropolitan area network (MAP), or any other network type. Unless otherwise indicated, as used herein, "or" does not require mutual exclusivity. The conferencing system 100, including either or both of the enterprise sub-system 102 and the data center sub-system 104, may utilize an Internet Protocol (IP) based backbone distributed architecture, which permits the components within the conferencing system 100 to communicate with one another using packet-based protocols, such as the Session Initiation Protocol (SIP). SIP is a protocol defined by the Internet Engineering Task Force (IETF) and documented under standard RFC3261. In one non-limiting example, the conferencing system 100 may be a Voice Over Internet Protocol (VOIP) network.

The components of the conferencing system 100, described below, allow an enterprise caller 106 and a non-enterprise caller 108 to participate in a linked conference 109 to allow communication with one another. The linked conference 109 includes at least two conferences that are in data communication with one another, at least one of which is part of the enterprise 102 and at least one of which is part of the data center 104. In the example of FIG. 1, the linked conference 109 includes a tributary conference 110 in data communication with the enterprise caller 106, and a home conference 111 in data communication with the non-enterprise caller 108.

Although two conference participants (i.e., the enterprise caller 106 and the non-enterprise caller 108) are shown in FIG. 1, any number of callers may participate in the linked conference 109. The linked conference 109 may be used as a medium through which the enterprise caller 106 and the non-enterprise caller 108 exchange audio, video, audio/video, or other communication-related data between one another. Non-limiting examples of the linked conference 109 include an audio conference, a video conference, an audio/video conference, streaming multimedia distribution, an instant messaging exchange, presence notification using detectors, an online game, a conference call, or other settings in which data may be communicated between the enterprise caller 106 and the non-enterprise caller 108.

The conferencing system 100 includes a first communication device 112 and a second communication device 114 from which the enterprise caller 106 and the non-enterprise caller 108 may initiate calls, respectively. The first communication device 112 is part of the enterprise network, and the second communication device 114 is outside of the enterprise 102. Calls made to the data center 104 by the non-enterprise caller using the second communication device 114 may be through a public switched telephone network (PSTN). The first and second communication devices 112, 114 may be the same or different devices, and are capable of communicating with other devices or entities. Non-limiting examples of the first and second communication devices 112, 114 include landline phones, Voice Over Internet Protocol (VOIP) phones, cellular phones, walkie talkies, computers (e.g., desktops, laptops, netbooks, and minicomputers), personal digital assistants, digital music players, digital readers, portable gaming devices, web browsing devices, media players, etc. Although the possible devices represented by the first and second communication devices 112, 114 are numerous, in the non-limiting example of FIG. 1, the first and second communication devices 112, 114 are phones.

The enterprise 102 includes a private branch exchange 116 that receives the calls made from the first communication device 112. The private branch exchange 116 is in data communication with the first communication device 112 and other components of the conferencing system 100. Data communication between the private branch exchange 116 and the first communication device 112 may use a wired or wireless communication medium. The private branch exchange 116 serves the enterprise 102, and can assist in routing the calls from the first communication device 112 to various locations. In some embodiments, such as those in which the first communication device 112 are devices other than phones, the private branch exchange 116 may be another type of routing device, or dispensed with altogether.

The enterprise 102 also includes a session border controller 118. The session border controller 118 is in data communication with the private branch exchange 116 and other components of the conferencing system 100. In the example in which the conferencing system 100 uses a VOIP network, the session border controller 118 may exert control over the signaling that occurs within the components of the conferencing system 100. Also, the session border controller 118 may act as an interface between the enterprise 102 and the data center 104. The session border controller 118 may include an untrusted side 120 and a trusted side 122. The enterprise network may plug in directly to the untrusted side 120 of the session border controller 118.

The enterprise 102 also includes an enterprise media server 124, on which the tributary conference 110 is created using the illustrative embodiments. As described below, data communication between the enterprise media server 124 and other components in the conferencing system 100, including the private branch exchange 116, may be established. In hosting the tributary conference 110, the enterprise media server 124 combines and shares data from and amongst the enterprise callers participating in the tributary conference 110, including the enterprise caller 106. As described below, the tributary conference 110 may also be linked with the home conference 111 to create the linked conference 109 so that the enterprise caller 106 can participate in a conference with the non-enterprise caller 108.

The data center 104 may be at a location that is separate or remote from the enterprise premises, and may include a gateway 126. The gateway 126 is in data communication with the enterprise 102 and other components in the conferencing system 100. The gateway 126 may be used as an interface with the enterprise 102 or any other devices external to the data center 104. The data center 104 also includes an application server 128, which is in data communication with the enterprise 102, the gateway 126, and other components in the conferencing system 100. In one embodiment, the application server 128 manages, such as by serving a call control function, the tributary conference 110 at the enterprise media server 124. The management functionality performed by the application server 128 may include conference control, billing, operator support, and other management functions. For example, the application server 128 may serve as a back-to-back user agent that is in data communication between the enterprise caller 106 and the enterprise media server 124. The application server 128 may also perform resource management, call flow, or data routing within the conferencing system 100, and communicate with the devices within the conferencing system 100 via SIP or other packet-based messaging. The data center 104 may also include a conferencing database 130 that tracks or stores the status of the tributary conference 110, home conference 111, or other conferences managed by the application server 128. Communication between the enterprise 102 and the data center 104 may be via a data communication medium 132. In one embodiment, the data communication medium is a wide area network (WAN). Other examples of the data communication medium 132 include a campus area network (CAN), a metropolitan area network (MAP), or any other network type.

In one embodiment of the operation of the conferencing system 100, the conferencing system 100 is a distributed architecture that allows the tributary conference 110 to be created on the enterprise media server 124 while conference control functionality is performed by the application server 128 at the data center 104. The enterprise caller 106 initiates a call on the first communication device 112. The call is received by the private branch exchange 116. The private branch exchange 116 may then route the call to the untrusted side 120 of the session border controller 118. The trusted side 122 of the session border controller 118 may then route the call to the gateway 126 at the data center 104 over the data communication medium 132.

After receiving the call, the gateway 126 may then route the call to the application server 128. In one embodiment, the application server 128, upon receiving the call, may identify the call is being associated with the enterprise 102. The application server 128 may also identify the enterprise media server 124 to host the tributary conference 110. In one example, the identification of the enterprise media server 124 to host the tributary conference 110 may be based on the location of the enterprise media server 124 at the enterprise 102. The enterprise media server 124, in one embodiment, is part of a trusted network that is administered by, or otherwise associated with, the same entity that is administered by, or otherwise associated with, the data center 104.

The application server 128 may then route the call back to the enterprise 102, and specifically to the enterprise media server 124. In doing so and thereafter, the application server 128 may act as a back-to-back user agent, or SIP B2B UA, to facilitate the establishment and maintenance of the tributary conference 110 at the enterprise media server 124. In acting as a back-to-back user agent, the application server 128 may be in data communication between the private branch exchange 116 and the enterprise media server 124.

After the application server 128 connects the call to the enterprise media server 124, the enterprise caller 106 may be interfaced with the enterprise media server 124. In one embodiment, a first data connection 134 may be established between the private branch exchange 116 and the session border controller 118. A second data connection 136 may also be established between the session border controller 118 and the enterprise media server 124 to establish a resulting data connection between the private branch exchange 116 and the enterprise media server 124. This resulting data connection, made up of the first and second data connections 134, 136, interfaces the private branch exchange 116 with the enterprise media server 124 and allows data communication between these two components. As a result of this resulting data connection, the enterprise caller 106 may also communicate with the enterprise media server 124. The routing of the call from the application server 128 to the enterprise media server 124 may help to establish the data communication between the private branch exchange 116 and the enterprise media server 124. One non-limiting example of how the application server 128 may help to establish the data connection between the private branch exchange 116 and enterprise media server 124 is described below in FIG. 2.

In one embodiment, the first and second data connections 134, 136 may be real-time transport protocol (RTP) streams that allow the private branch exchange 116 and the enterprise media server 124 to communicate via RTP. RTP is a protocol defined by the IETF for streaming real time multimedia over an IP network in packets. The first and second data connections 134, 136 may also utilize other real time protocols. By streaming data between the private branch exchange 116 and the enterprise media server 124 via the session border controller 118, the data need not be streamed via the data center 104. Thus, in some embodiments, bandwidth needed to stream data between the enterprise 102 and the data center 104 is saved or reduced, and the enterprise caller 106 may incur less or no delay in the conference mixing of their audio.

The enterprise 102 may then communicate with the application server 128 in order to establish, or create, the tributary conference 110 and join the enterprise caller 106 to the tributary conference 110. In one embodiment, the application server 128 queries the enterprise caller 106, via the enterprise media server 124, for conference access data. The conference access data may include identification information, a pass code, a conference code, conferencing configuration information, or other data that can help to authenticate a caller or identify a conference. After receiving the query for conference access data from the application server 128, the enterprise caller 106 may input the conference access data. The enterprise media server 124 may then send the conference access data inputted by the enterprise caller 106 to the application server 128. The application server 128 may then determine whether the conference access data entered by the enterprise caller 106 is valid. In one embodiment, a provisioning database (not shown) at the data center 104 may be used to validate the conference access data that is inputted by the enterprise caller 106. The provisioning database may also confirm that the enterprise media server 124 is available for conference usage. If the application server 128 determines that the conference access data is valid, the application server 128 may initiate the tributary conference 110 on the enterprise media server 124, or may join the enterprise caller 106 to the tributary conference 110 if the tributary conference 110 is already created.

In one embodiment of the application server 128 initiating the tributary conference 110 on the enterprise media server 124, the enterprise media server 124 may receive a set of conference creation instructions to create the tributary conference 110 on the enterprise media server 124. As used herein, the term "set" encompasses a quantity of one or more. The conference creation instructions may be associated with an SIP INFO signal, and may instruct the enterprise media server 124 to create the tributary conference 110.

The conferencing database 130 may be used to determine if a conference associated with the conference access data entered by the enterprise caller 106 is already created. If no conference has been created, the conferencing database 130 may work in conjunction with the application server 128 to create the tributary conference 110, and associate a unique conference identifier with the tributary conference 110.

After the tributary conference 110 has been created on the enterprise media server 124, the application server 128 may send a set of conference joinder instructions to join the call from the enterprise caller 106 to the tributary conference 110. The conference joinder instructions may be associated with an SIP INFO signal, and may instruct the enterprise 102 to join the call to the tributary conference 110. Upon receiving the conference joinder instructions, the call from the enterprise caller 106 may be joined to the tributary conference 110.

In one embodiment, if the tributary conference 110 is created on an enterprise media server 124 other than the one to which the enterprise caller 106 is connected, the application server 128 may switch the call to the media server that includes the tributary conference 110. In this way, the conferencing system 100 may join the enterprise caller 106 to the tributary conference 110 when the tributary conference 110 is contained on a media server other than the enterprise media server 124 to which the enterprise caller 106 is connected.

Subsequent enterprise callers at the enterprise 102 may then be joined to the tributary conference 110 so that the subsequent enterprise callers may communicate with the enterprise caller 106 via the tributary conference 110. By way of illustration, a subsequent enterprise caller (not shown) may initiate a subsequent enterprise call using a different communication device at the enterprise 102, and the subsequent enterprise call may be received by the private branch exchange 116. Following a similar route as the call initiated by the enterprise caller 106, the subsequent enterprise call may be routed to the session border controller 118, and then routed to the gateway 126 at the data center 104. The subsequent enterprise call may then be routed from the gateway 126 to the application server 128, and then connected to the enterprise media server 124. A new data, or RTP, connection between the private branch exchange 116 and the enterprise media server 124 may be established for the subsequent enterprise call, and for each enterprise call subsequent to the call made by the enterprise caller 106. Using the interface between the private branch exchange 116 and the enterprise media server 124, described above, the subsequent enterprise caller may be prompted to enter conference access data, and this conference access data may be validated at the data center 104 to determine whether the subsequent enterprise caller is authorized to join, or otherwise associated with, the tributary conference 110. If the subsequent enterprise caller is authorized to join the tributary conference 110, the application server 128 may send conference joinder instructions to the enterprise 102 so that the subsequent enterprise caller is joined to the tributary conference 110.

In another embodiment, the non-enterprise caller 108 may be joined into a conference with the enterprise caller 106. The non-enterprise caller 108 may dial into the data center 104 using the second communication device 114, and a second, or non-enterprise, call 137 may be made over a PSTN network. In the example of FIG. 1, the second, or non-enterprise, call 137 is initiated after the call made by the enterprise caller 106. When the non-enterprise call 137 is initiated after the call made by the enterprise caller 106, only the tributary conference 110 may be created within the conferencing system 100 until such time as the non-enterprise call 137 is placed by the non-enterprise caller 108. As a result, the home conference 111 or the linked conference 109 is not created until such time as the non-enterprise call 137 is placed by the non-enterprise caller 108. In this manner, some resources within the conferencing system 100 are not used until they are needed, resulting in improved resource utilization. In some embodiments, prior to the placement of the non-enterprise call 137, a logical home conference may be created within the application server 128, but no home conference 111 may be created on the data center media server 138. The non-enterprise call 137 from the non-enterprise caller 108 may be received by the gateway 126, and the gateway 126 may convert the non-enterprise call 137 into an Internet Protocol (IP) call.

After receiving the non-enterprise call 137 from the non-enterprise caller 108, the data center 104 may interface the non-enterprise caller 108 with a data center media server 138. In one embodiment, interfacing the non-enterprise caller 108 with the data center media server 138 includes routing the non-enterprise call 137 from the gateway 126 to the application server 128. The non-enterprise call 137 may then be routed from the application server 128 to the data center media server 138. Data communication may then be established between the gateway 126 and the data center media server 138. The data communication between the gateway 126 and the data center media server 138 may be via an RTP connection 140.

Once communication is established between the gateway 126 and the data center media server 138, the application server 128 creates the home conference 111 on the data center media server 138. In one embodiment, the application server 128 queries the non-enterprise caller 108, via the data center media server 138, for conference access data. After receiving the query for conference access data from the application server 128, the non-enterprise caller 108 may input the conference access data. The data center media server 138 may then transmit the conference access data inputted by the non-enterprise caller 108 to the application server 128. The application server 128 may then determine whether the conference access data entered by the non-enterprise caller 108 is valid. If the application server 128 determines that the conference access data is valid, the application server 128 may initiate the home conference 111 on the data center media server 138, or may join the non-enterprise caller 108 to the home conference 111 if the home conference 111 is already created.

In one embodiment of the application server 128 initiating the home conference 111 on the data center media server 138, the data center media server 138 may receive a set of conference creation instructions to create the home conference 111 on the data center media server 138. The conference creation instructions may be associated with an SIP INFO signal, and may instruct the data center media server 138 to create the home conference 111.

After the home conference 111 has been created on the data center media server 138, the application server 128 may send a set of conference joinder instructions to join the non-enterprise call 137 to the home conference 111. The conference joinder instructions may be associated with an SIP INFO signal, and may instruct the data center media server 138 to join the call to the home conference 111. Upon receipt of the conference joinder instructions, the non-enterprise call 137 may be joined to the home conference 111.

Once the home conference 111 has been created and the non-enterprise caller 108 has been joined to the home conference 111, the application server 128 interfaces the home conference 111 to the tributary conference 110 to form the linked conference 109, which allows the enterprise caller 106 and the non-enterprise caller 108 to be in a conference with one another. In interfacing the home conference 111 to the tributary conference 110, audio communication may be established between the home conference 111 and the tributary conference 110. For example, an RTP connection, or stream, 142 may be used to communicate audio between the home conference 111 and the tributary conference 110, thereby allowing the non-enterprise caller 108 to communicate with the enterprise caller 106.

In one embodiment, the home conference 111 is interfaced with the tributary conference 110 by the issuance of two outbound calls from the application server 128. For example, the application server 128 may send a first outbound call to the enterprise media server 124, and a second outbound call to the data center media server 138. In addition, the application server 128 may act as a back-to-back user agent (e.g., B2B SIP UA) for the first and second outbound calls, and may be in data communication between the enterprise media server 124 and the data center media server 138. The first outbound call may be joined to the tributary conference 110, and the second outbound call may be joined to the home conference 111, thereby creating an audio link between the tributary conference 110 and the home conference 111.

The illustrative embodiments described herein may be extended to multiple enterprises and data centers so that a distributed conference that includes multiple tributary conferences may be implemented within the conferencing system 100. These multiple tributary and home conferences may be interconnected via audio, RTP, or other data connections to allow for a linked conference that includes distributed participants.

The illustrative embodiments may be useful in conserving conferencing system resources. For example, the home conference 111 may only be created on the data center media server 138 when the non-enterprise caller 108 joins the conference at the data center 104. Prior to the non-enterprise caller 108 joining the conference at the data center 104, only the tributary conference 110 may be created at the enterprise media server 124, and the tributary conference 110 may be used to conference callers at the enterprise 102. In this manner, bandwidth, component usage, and other resources of the conferencing system 100 may be conserved until such time as they are needed, such as when the non-enterprise caller 108 joins a conference. Also, when only enterprise callers are participating in a conference, the tributary conference 110 may be implemented by using a compact deployment of components at the enterprise 102 (e.g., session border controller 118 and enterprise media server 124) and by relying on components of the data center 104 to implement certain aspects of the tributary conference 110.

Figure 2:
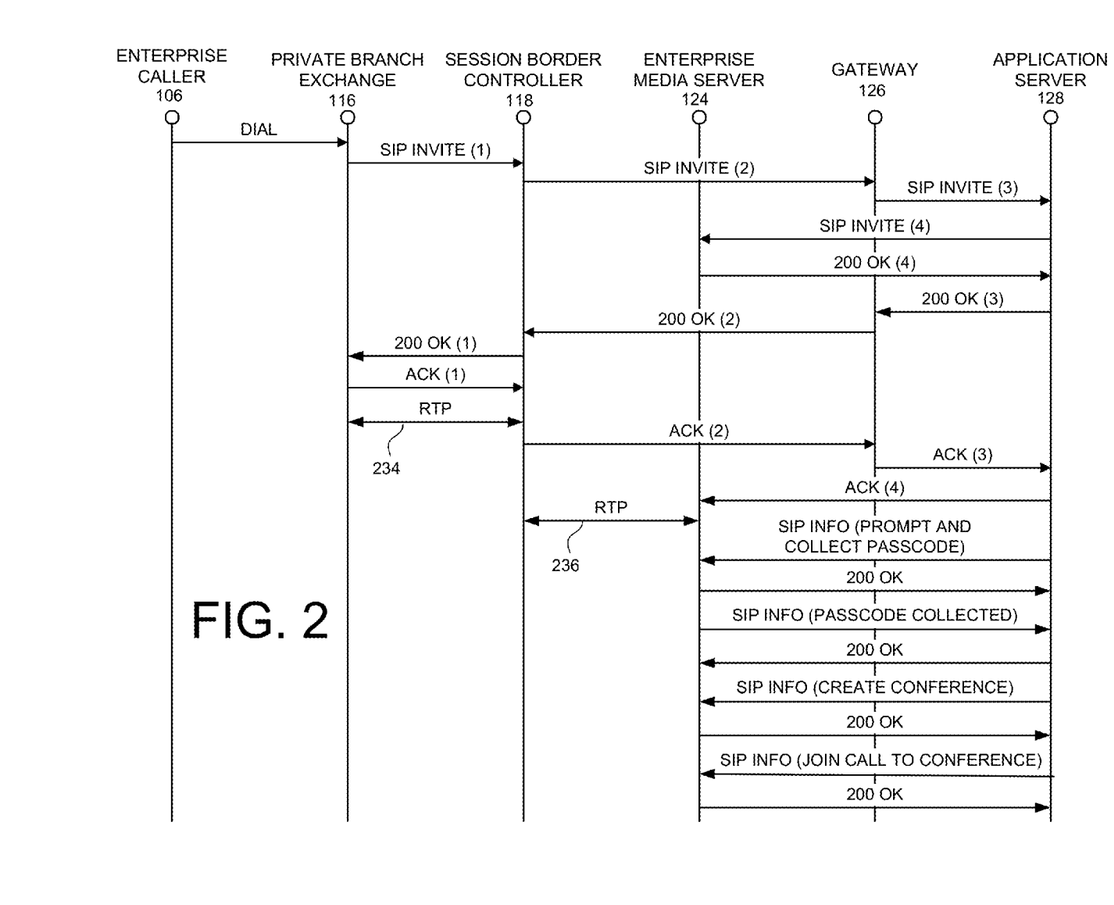
FIG. 2 is a schematic diagram showing the interaction between the components in FIG. 1 when a call is placed by an enterprise caller according to one illustrative embodiment.

Referring to FIG. 2, one non-limiting example of how the illustrative embodiments described in FIG. 1 may be implemented is shown. In particular, FIG. 2 shows the enterprise caller 106 placing a call and being joined to the tributary conference 110 in FIG. 1. In FIG. 2, no non-enterprise caller, such as the non-enterprise caller 108 in FIG. 1, is placing a call requesting to be in a conference with the enterprise caller 106.

The enterprise caller 106, using the first communication device 112, dials into the private branch exchange 116. The private branch exchange 116 may then send an SIP INVITE signal to the session border controller 118. The SIP INVITE signal, and several other instructions described in FIG. 2, is part of the Session Initiation Protocol (SIP) that is usable to control multimedia communications sessions, such as video, audio, or audio/video calls over Internet Protocol. The parentheticals (e.g., (1), (2), etc.) after the SIP signals in FIG. 2, as well as FIG. 3 below, are used to signify SIP signals that are associated with one another. For example, SIP signals that are both followed by a (1) may be in response to one another.

The session border controller 118 may then send an SIP INVITE to the gateway 126. The gateway 126 may send an SIP INVITE to the application server 128. The application server 128 may send an SIP INVITE to the enterprise media server 124. The enterprise media server 124 then sends a 200 OK signal to the application server 128. The application server 128 then sends a 200 OK signal to the gateway 126. The gateway 126 then sends a 200 OK signal to the session border controller 118. The session border controller 118 sends a 200 OK signal to the private branch exchange 116.

In response to receiving the 200 OK signal from the session border controller 118, the private branch exchange 116 sends an ACK signal to the session border controller 118. A real-time transport protocol (RTP) connection 234 may then be established between the private branch exchange 116 and the session border controller 118. Elements of FIGS. 2 and 3 that are analogous to elements in FIG. 1 have been shown by indexing the reference numerals by 100. The session border controller 118 may then send an ACK signal to the gateway 126, and the gateway 126 may send an ACK signal to the application server 128. The application server 128 may send an ACK signal to the enterprise media server 124. In response to receiving the ACK signal from the application server 128, an RTP connection 236 is established between the session border controller 118 and the enterprise media server 124.

A composite, or resulting, data link, made up of the RTP connections 234 and 236, allows data communication between the private branch exchange 116 and the enterprise media server 124. This composite data link allows the enterprise caller 106 to communicate with the application server 128 to, e.g., create or join a conference.

Next, the application server 128 sends an SIP INFO signal to the enterprise media server 124 that initiates a prompt to collect conference access data, such as a pass code. The enterprise media server 124 responds with a 200 OK signal to the application server 128. The conference access data may be entered by the enterprise caller 106, and this conference access data may be passed to the application server 128 using an SIP INFO signal from the enterprise media server 124 to the application server 128. The application server 128 may then respond with a 200 OK signal to the enterprise media server 124.

The application server 128 may then send an SIP INFO signal to the enterprise media server 124, which may be associated with conference creation instructions, to create a conference at the enterprise media server 124. The enterprise media server 124 may then respond with a 200 OK signal to the application server 128. The application server 128 may then send an SIP INFO signal, which may be associated with conference joinder instructions, to the enterprise media server 124 to join the enterprise caller 106 to the conference. The enterprise media server 124 may then respond with a 200 OK signal to the application server 128. The packet-based signaling described in FIG. 2 is only one example of how the conferencing system 100 described in FIG. 1 may be implemented.

Figure 3:
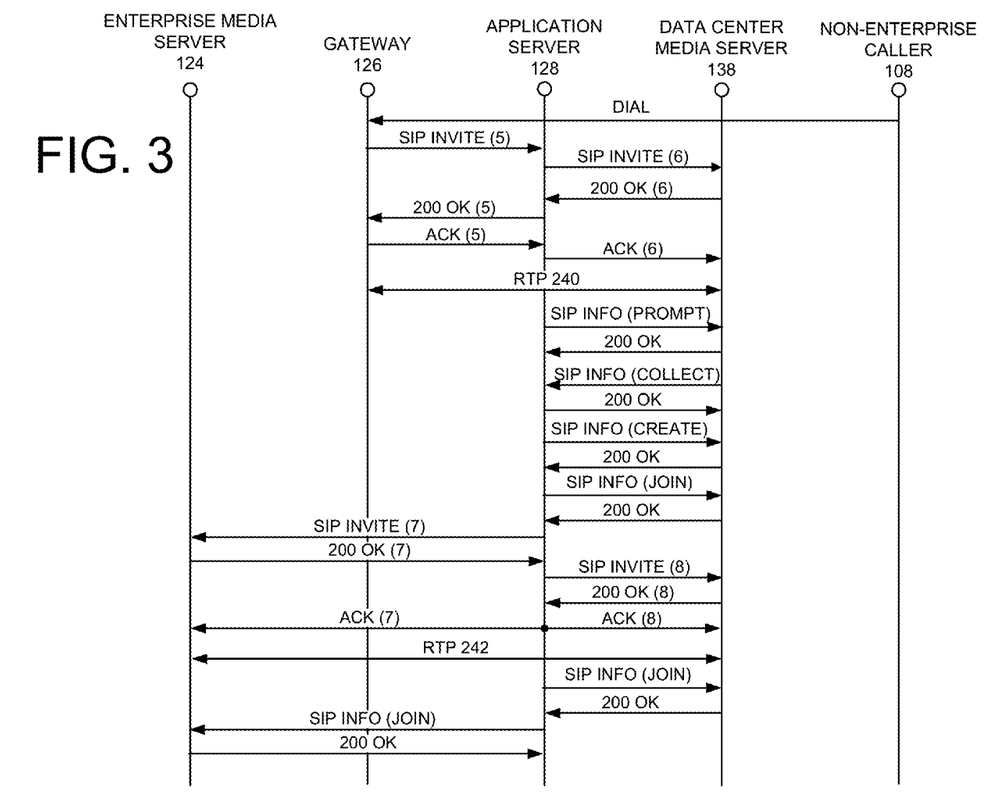
FIG. 3 is a schematic diagram showing the interaction between the components in FIG. 1 when a call is placed by a non-enterprise caller according to one illustrative embodiment.

Referring to FIG. 3, another non-limiting example of how the illustrative embodiments described in FIG. 1 may be implemented is shown. In particular, the interaction described in FIG. 3 may occur after the interaction described in FIG. 2, and may be triggered when the non-enterprise caller 108 dials into the data center 104 in FIG. 1 over a PSTN network.

The non-enterprise caller 108, using the second communication device 114, dials into the data center, and the call is received by the gateway 126. The gateway 126 may then send an SIP INVITE to the application server 128. The application server 128 may then send an SIP INVITE to the data center media server 138, and the data center media server 138 may respond by sending a 200 OK signal to the application server 128. The application server 128 may then send a 200 OK signal to the gateway 126. In response, the gateway 126 may send an ACK to the application server 128, and the application server 128 may then send an ACK to the data center media server 138. An RTP connection 240 may then be established between the gateway 126 and the data center media server 138.

Next, the application server 128 sends an SIP INFO signal to the data center media server 138 that initiates a prompt to collect conference access data, such as a pass code. The data center media server 138 responds with a 200 OK signal to the application server 128. The conference access data may be entered by the non-enterprise caller 108, and this conference access data may be passed to the application server 128 using an SIP INFO signal from the data center media server 138 to the application server 128. The application server 128 may then respond with a 200 OK signal to the data center media server 138.

The application server 128 may then send an SIP INFO signal to the data center media server 138, which may be associated with conference creation instructions, to create a home conference at the data center media server 138. The data center media server 138 may then respond with a 200 OK signal to the application server 128. The application server 128 may then send an SIP INFO signal, which may be associated with conference joinder instructions, to the data center media server 138 to join the non-enterprise caller 108 to the conference. The data center media server 138 may then respond with a 200 OK signal to the application server 128.

The application server 128 then sends an SIP INVITE to the enterprise media server 124, which responds with a 200 OK back to the application server 128. The application server 128 sends an SIP INVITE to the data center media server 138, which responds with a 200 OK back to the application server 128. The application server 128 then issues two ACK signals: one to the enterprise media server 124, and the other to the data center media server 138. An RTP connection 242 is then established between the enterprise media server 124 and the data center media server 138. The RTP connection 242 allows for an audio link between the enterprise media server 124 and the data center media server 138, and creates a linked conference between the conferences residing on the enterprise media server 124 and the data center media server 138.

The application server 128 may then send an SIP INFO signal, which may include conference joinder instructions, to the data center media server 138. The data center media server 138 may respond with a 200 OK signal to the application server 128. The application server 128 may then send an SIP INFO signal, which may include conference joinder instructions, to the enterprise media server 124. The enterprise media server 124 may respond with a 200 OK signal to the application server 128. The packet-based signaling described in FIG. 3 is only one example of how the conferencing system 100 described in FIG. 1 may be implemented.

Figure 4:
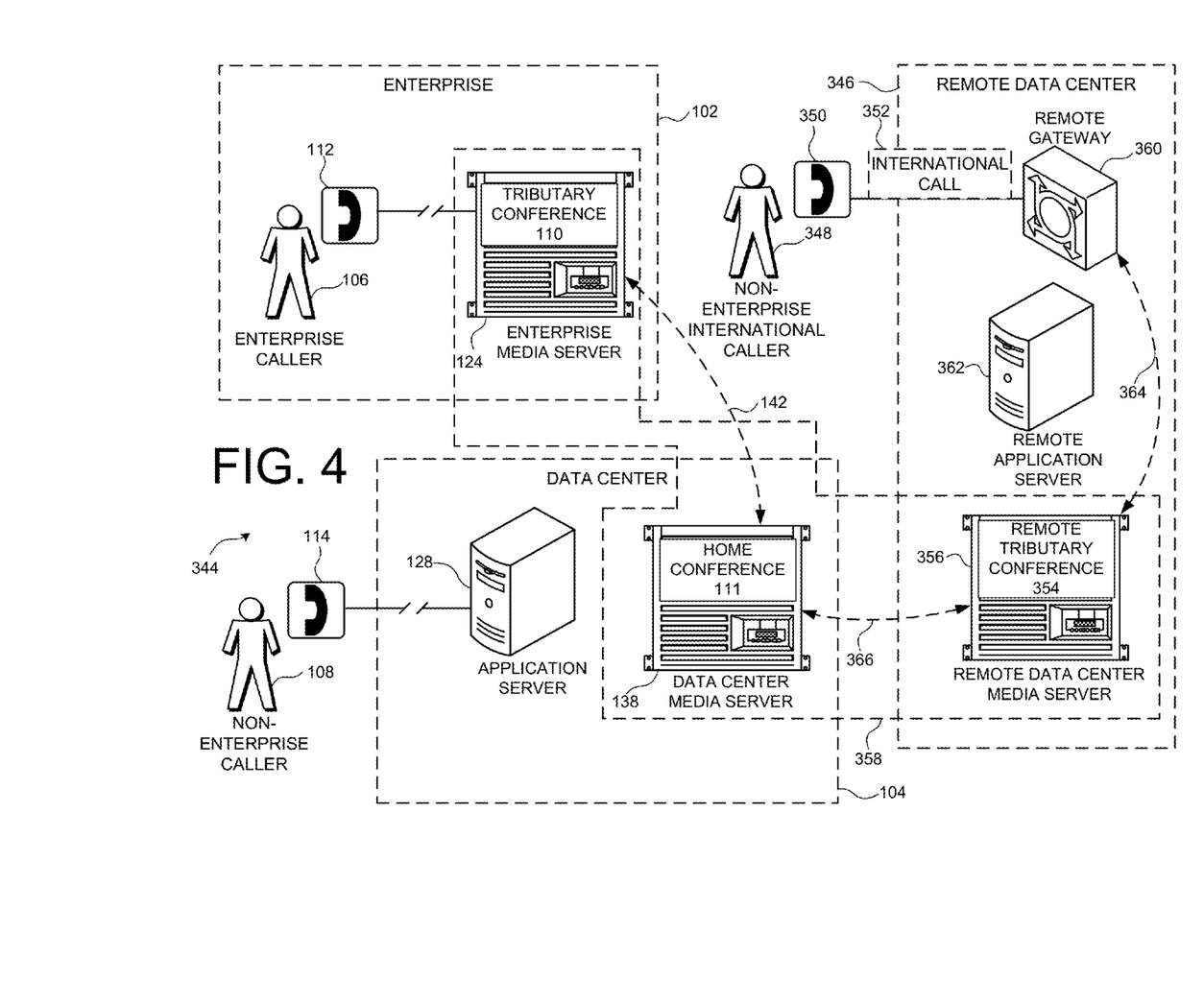
FIG. 4 is a schematic, pictorial representation of an international conferencing system that includes at least one international caller according to an illustrative embodiment.

Referring to FIG. 4, an illustrative embodiment of an international conferencing system 344 includes the enterprise 102, the data center 104, and a remote data center 346 located in a different country than the data center 104. The enterprise 102 and the data center 104 portions of the conferencing system 344 have been simplified in FIG. 4 to aid understanding of the international aspects of the conferencing system 344. However, the enterprise 102 and the data center 104 may contain similar or additional components as the enterprise 102 and the data center 104 described in FIG. 1.

In FIG. 4, a non-enterprise international caller 348 uses a third communication device 350 to join into a conference with the enterprise caller 106 and the non-enterprise caller 108. In the example in FIG. 4, the non-enterprise international caller 348 may place an international call 352 via a PSTN network after the enterprise caller 106 and the non-enterprise caller 108 have been joined into a linked conference, such as the linked conference 109 described in FIG. 1. A remote tributary conference 354, to which the non-enterprise international caller 348 is joined, may be created on a remote data center media server 356. Data communication may then be established between the home conference 111 and the remote tributary conference 354 to establish, or form, an international linked conference 358 between the tributary conference 110, the home conference 111, and the remote tributary conference 354.

The non-enterprise international caller 348 dials into the remote data center 346, and the international call 352 is received by a remote gateway 360. The remote gateway 360 forwards the international call 352 to a remote application server 362, and the remote application server 362 connects the international call 352 to the remote data center media server 356. A data connection, such as an RTP connection 364, is then established between the remote gateway 360 and the remote data center media server 356, allowing communication between the non-enterprise international caller 348 and the remote data center media server 356. Conference access data may then be collected from the non-enterprise international caller 348. The conference access data, in one embodiment, may be collected using dual-tone multi-frequency (DTMF). If the conference access data entered by the non-enterprise international caller 348 is valid, the remote tributary conference 354 may be created on the remote data center media server 356. The non-enterprise international caller 348 may then be joined to the remote tributary conference 354.

The remote application server 362 may then recognize that the non-enterprise international caller 348 is attempting to join a conference having a home at the data center 104. The remote application server 362 may then issue an SIP REFER to the remote gateway 360 to transfer the international call 352 to the application server 128 at the data center 104.

The international call 352 is then received at the data center 104, and specifically may be received at the application server 128. The application server 128 identifies the international call 352 as originating from the remote data center 346. The application server 128 may then connect the international call 352 to the remote data center media server 356 at the remote data center 346. In one embodiment, any existing RTP connection that provides call control to the remote application server 362 may be torn down. The application server 128 may be interfaced with the remote data center 346 to establish call control of the international call 352 by the application server 128. For example, an RTP connection may be established that provides call control of the international call 352 to the application server 128 at the data center 104.

In one embodiment, instead of being created by the remote application server 362, the remote tributary conference 354 may be created by the application server 128 when the application server 128 has call control of the international call 352. In this embodiment, the application server 128 may then link the remote tributary conference 354 to the home conference 111 at the data center 104, and join the international call 352 to the remote tributary conference 354.

Once the non-enterprise international caller 348 is joined to the remote tributary conference 354 on the remote data center media server 356, the application server 128 may interface the home conference 111 to the remote tributary conference 354 to form the international linked conference 358 between the enterprise caller 106, the non-enterprise caller 108, and the non-enterprise international caller 348. In one embodiment, the home conference 111 and the remote tributary conference 354 is interfaced by the issuance of two outbound calls by the application server 128. For example, the application server 128 may issue a first outbound call to the data center media server 138, and issue a second outbound call to the remote data center media server 356. An RTP stream 366 may then be established between the data center media server 138 and the remote data center media server 356. In one embodiment, a first outbound call is joined to the home conference 111 and a second outbound call is joined to the remote tributary conference 354 to create an audio link between the home conference 111 and the remote tributary conference 354.

In an alternate embodiment, the remote data center 346, instead of being located in a separate country than the data center 104, is located in a different region or jurisdiction. Using the illustrative embodiments described in FIG. 4, global callers may be joined into conferences with enterprise and non-enterprise callers using an interconnected distributed conferencing system, such as the international conferencing system 344.

Figure 5:
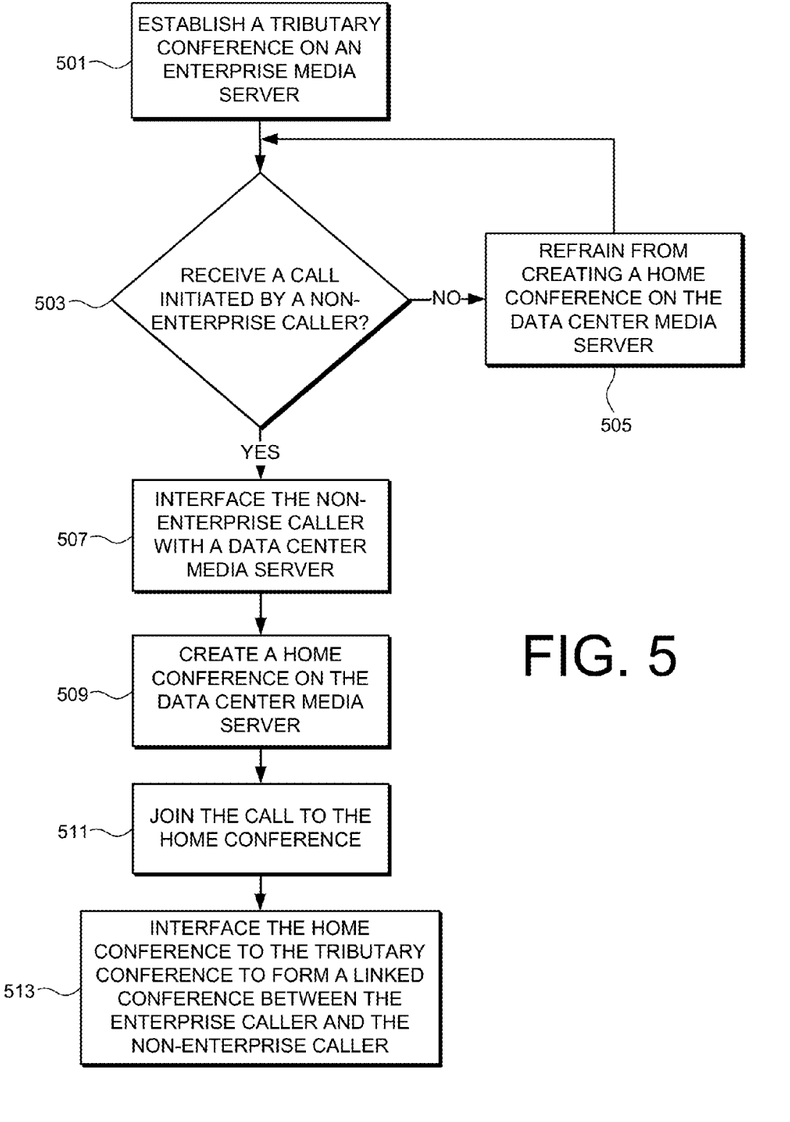
FIG. 5 is a flowchart of a process for conferencing enterprise and non-enterprise callers that is executable by a data center according to an illustrative embodiment.

Referring to FIG. 5, an illustrative embodiment of a process that may be executed by a data center, such as the data center 104 in FIG. 1, includes establishing a tributary conference on enterprise media server (step 501). In one embodiment, the tributary conference is in data communication with the enterprise caller at an enterprise in response to a call from the enterprise caller. The method includes determining whether a call initiated by a non-enterprise caller is received (step 503). If the process determines that no call initiated by a non-enterprise caller is received, the process refrains from creating a home conference on the data center media server (step 505). The process then returns to step 503.

If the process determines that a call initiated by a non-enterprise caller is received, the process interfaces the non-enterprise caller with a data center media server (step 507). The process creates a home conference on the data center media server (step 509). The process joins the call initiated by the non-enterprise caller to the home conference (step 511). The process interfaces the home conference to the tributary conference to form a linked conference between the enterprise caller and the non-enterprise caller (step 513).

Figure 6:
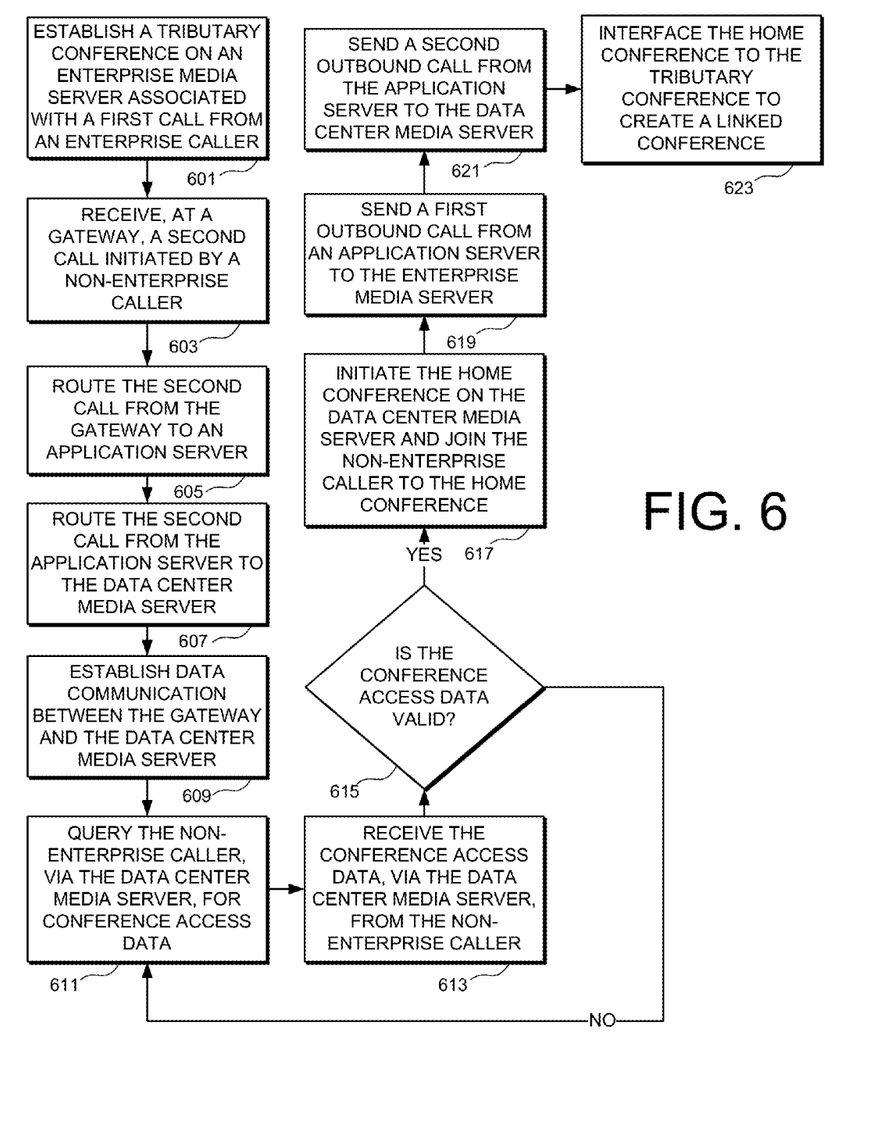
FIG. 6 is a flowchart of a process for conferencing enterprise and non-enterprise callers that is executable by a data center according to another illustrative embodiment.

Referring to FIG. 6, an illustrative embodiment of a process that may be executed by a data center, such as the data center 104 in FIG. 1, includes establishing a tributary conference on enterprise media server associated with a first call from an enterprise caller (step 601). The process receives, at a gateway, a second call initiated by a non-enterprise caller (step 603). The process routes the second call from the gateway to an application server (step 605). The process routes the second call from the application server to the data center media server (step 607).

The process establishes data communication between the gateway and the data center media server (step 609). The process queries the non-enterprise caller, via the data center media server, for conference access data (step 611). The process receives the conference access data, via the data center media server, from the non-enterprise caller (step 613). The process determines whether the conference access data is valid (step 615). If the process determines that the conference access is not valid, the process returns to step 611.

If the process determines that the conference access data is valid, the process initiates the home conference on the data center media server and joins the non-enterprise caller to the home conference (step 617). The process sends a first outbound call from an application server to the enterprise media server (step 619). The process sends a second outbound call from the application server to the data center media server (step 621). The process interfaces the home conference to the tributary conference to create a linked conference (step 623).

Figure 7:
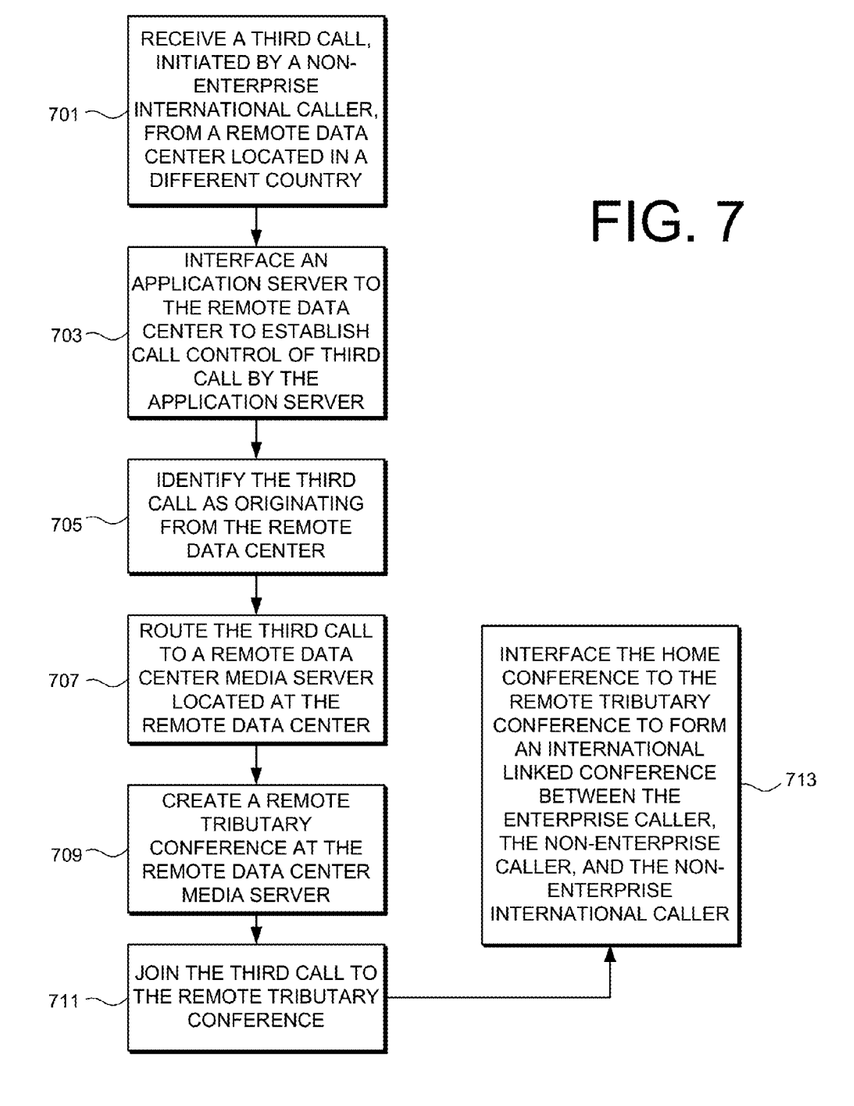
FIG. 7 is a flowchart of a process for conferencing enterprise and non-enterprise international callers that is executable by a data center according to an illustrative embodiment.

Referring to FIG. 7, an illustrative embodiment of a process that allows for global callers and which may be executed by a data center, such as the data center 104 in FIG. 1, is shown. The process in FIG. 7, in one embodiment, may occur after, or approximately after, the process(es) described in FIG. 5 or 6. The process includes receiving a third call, initiated by a non-enterprise international caller, from a remote data center located in a different country (step 701). The process interfaces an application server to the remote data center to establish call control of the third call by the application server (step 703). The process identifies the third call as originating from the remote data center (step 705). The process routes the third call to a remote data center media server located at the remote data center (step 707).

The process creates a remote tributary conference at the remote data center media server (step 709). The process joins the third call to the remote tributary conference (step 711). The process interfaces the home conference to the remote tributary conference to form an international linked conference between the enterprise caller, the non-enterprise caller, and the non-enterprise international caller (step 713).

Figure 8:
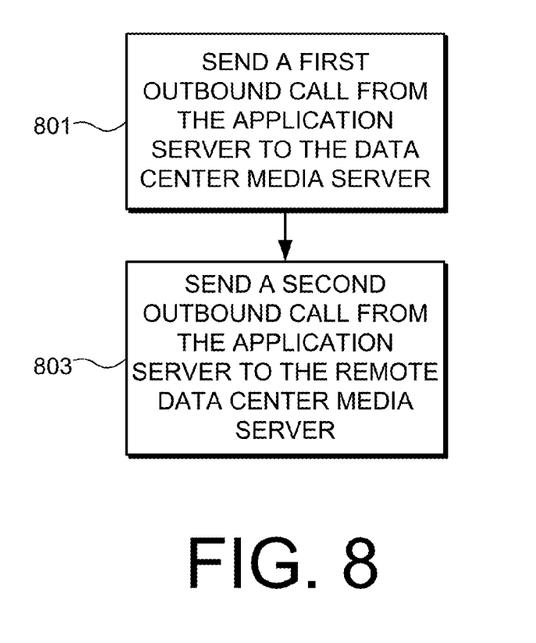
FIG. 8 is a flowchart of a process for interfacing a home conference to a remote tributary conference to form an international linked conference as described in FIG. 7.

Referring to FIG. 8, a process for interfacing the home conference to the remote tributary conference to form an international linked conference, referred to in step 713 in FIG. 7, may include sending a first outbound call from the application server to the data center media server (step 801). The process sends a second outbound call from the application server to the remote data center media server (step 803).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

As used herein, including in the claims, the terms first, second, third, etc. . . . used in relation to calls (e.g., first call, second call, third call, etc.) are for reference or identification purposes only, and these terms are not intended to describe or suggest a number, order, source, purpose, or substantive quality for any call for which such a term is used. For example, the "second" call, initiated by a non-enterprise caller, or the "third" call, initiated by a non-enterprise international caller, may be received before the "first" call initiated by an enterprise caller. The conferencing system described in the illustrative embodiments is able to conference callers as described herein regardless of the order in which the described calls are received.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for conferencing enterprise and non-enterprise callers, the method comprising:
   receiving a first call initiated by an enterprise caller at an enterprise;
   communicating with an enterprise media server to initiate a tributary conference on the enterprise media server;
   joining the enterprise caller to the tributary conference such that the enterprise caller is in data communication with the tributary conference;
   receiving a second call initiated by a non-enterprise caller via a public switched telephone network at a gateway of a data center;
   converting the second call into an internet protocol call at the data centre;
   interfacing the non-enterprise caller with a data center media server of the data center;
   creating a home conference on the data center media server;
   joining the second call to the home conference on the data center media server;

interfacing the home conference on the data center media server to the tributary conference on the enterprise media server to form a linked conference between the enterprise caller and the non-enterprise caller;
wherein interfacing the non-enterprise caller with the data center media server comprises:
routing the second call from the gateway to an application server of the data center;
routing the second call from the application server to the data center media server; and
establishing data communication between the gateway and the data center media server.

2. The method of claim 1, wherein creating the home conference on the data center media server and joining the non-enterprise caller to the home conference comprises:
querying the non-enterprise caller, via the data center media server, for conference access data;
receiving the conference access data, via the data center media server, from the non-enterprise caller;
determining whether the conference access data is valid; and
initiating the home conference on the data center media server and joining the non-enterprise caller to the home conference in response to the conference access data being valid.

3. The method of claim 1, wherein interfacing the home conference on the data center media server to the tributary conference on the enterprise media server comprises:
sending a first outbound call from an application server to the enterprise media server;
sending a second outbound call from the application server to the data center media server;
joining the first outbound call to the tributary conference; and
joining the second outbound call to the home conference.

4. The method of claim 1, wherein interfacing the home conference on the data center media server to the tributary conference on the enterprise media server comprises:
sending a first outbound call from an application server to the enterprise media server;
sending a second outbound call from the application server to the data center media server; and
wherein the application server acts as a back-to-back user agent in data communication between the enterprise media server and the data center media server.

5. The method of claim 1, further comprising:
receiving a third call from a remote data center, the third call initiated by a non-enterprise international caller, the remote data center being located in a different country;
identifying the third call as originating from the remote data center;
routing the third call to a remote data center media server located at the remote data center;
interfacing an application server to the remote data center to establish call control of the third call by the application server;
joining the third call to a remote tributary conference at the remote data center media server;
interfacing the home conference on the data center media server to the remote tributary conference on the remote data center media server to form an international linked conference between the enterprise caller, the non-enterprise caller, and the non-enterprise international caller.

6. The method of claim 1, further comprising:
receiving a third call from a remote data center, the third call initiated by a non-enterprise international caller;
identifying the third call as originating from the remote data center;
routing the third call to a remote data center media server located at the remote data center;
interfacing an application server to the remote data center to establish call control of the third call by the application server;
creating a remote tributary conference at the remote data center media server;
joining the third call to the remote tributary conference;
interfacing the home conference on the data center media server to the remote tributary conference on the remote data center media server to form an international linked conference between the enterprise caller, the non-enterprise caller, and the non-enterprise international caller, wherein interfacing the home conference to the remote tributary conference comprises:
sending a first outbound call from the application server to the data center media server;
sending a second outbound call from the application server to the remote data center media server;
joining the first outbound call to the home conference; and
joining the second outbound call to the remote tributary conference.

7. The method of claim 1, further comprising:
receiving a third call from a remote data center, the third call initiated by a non-enterprise international caller, the remote data center being located in a different country;
identifying the third call as originating from the remote data center;
routing the third call to a remote data center media server located at the remote data center;
interfacing an application server to the remote data center to establish call control of the third call by the application server;
creating a remote tributary conference at the remote data center media server;
joining the third call to the remote tributary conference; and
interfacing the home conference on the data center media server to the remote tributary conference on the remote data center media server to form an international linked conference between the enterprise caller, the non-enterprise caller, and the non-enterprise international caller, wherein interfacing the home conference to the remote tributary conference comprises:
sending a first outbound call from the application server to the data center media server;
sending a second outbound call from the application server to the remote data center media server, the second outbound call being sent at about a same time as the first outbound call; and
joining the second call and the third call to the international linked conference.

8. The method of claim 1, further comprising:
joining the first call and the second call to the linked conference.

9. The method of claim 1, wherein interfacing the home conference on the data center media server to the tributary conference on the enterprise media server comprises establishing audio communication between the home conference and the tributary conference.

10. The method of claim 1, wherein interfacing the home conference on the data center media server to the tributary conference on the enterprise media server comprises establishing a real-time transport protocol data stream between the home conference and the tributary conference, the real-time transport protocol data stream being used communicate audio between the home conference and the tributary conference.

11. The method of claim 1, wherein the second call is initiated after the first call.

12. A method for conferencing enterprise and non-enterprise callers, the method comprising:
   establishing a tributary conference on an enterprise media server, the tributary conference in data communication with an enterprise caller at an enterprise in response to a first call from the enterprise caller;
   receiving a second call initiated by a non-enterprise caller at a gateway of a data center;
   converting the second call into an internet protocol call at the data centre;
   interfacing the non-enterprise caller with a data center media server of the data center;
   creating a home conference on the data center media server;
   joining the second call to the home conference on the data center media server; and
   interfacing the home conference on the data center media server to the tributary conference on the enterprise media server to form a linked conference between the enterprise caller and the non-enterprise caller;
   wherein interfacing the non-enterprise caller with the data center media server comprises:
      routing the second call from the gateway to an application server of the data center;
      routing the second call from the application server to the data center media server; and
      establishing data communication between the gateway and the data center media server.

13. The method of claim 12, wherein the second call is initiated via a public switched telephone network.

14. The method of claim 12, wherein the home conference is created on the data center media server after the second call is received.

15. The method of claim 12, wherein interfacing the home conference on the data center media server to the tributary conference on the enterprise media server comprises:
   sending a first outbound call from an application server to the enterprise media server;
   sending a second outbound call from the application server to the data center media server;
   joining the first outbound call to the tributary conference; and
   joining the second outbound call to the home conference.

16. A conferencing system comprising:
   an enterprise sub-system comprising:
      a first communication device to initiate a first call from an enterprise caller; and
      an enterprise media server to host a tributary conference in data communication with the first communication device; and
   a data center sub-system at a separate location from the enterprise sub-system, the data center sub-system comprising:
      a gateway to receive a second call initiated by a non-enterprise caller via a public switched telephone network, the non-enterprise caller using a second communication device to initiate the second call, the gateway to convert the second call into an internet protocol call;
      a data center media server to host a home conference in data communication with the second communication device; and
      an application server to interface the home conference on the data center media server with the tributary conference on the enterprise media server by routing the second call from the application server to the data center media server and establishing data communication between the gateway and the data center media server.

17. The conferencing system of claim 16, wherein the application server is adapted to establish audio communication between the home conference and the tributary conference.

18. The conferencing system of claim 16, further comprising:
   a remote data center sub-system in a different country than the data center sub-system, the remote data center sub-system comprising:
      a remote gateway to receive a third call initiated by a non-enterprise international caller, the non-enterprise international caller using a third communication device to initiate the third call;
      a remote data center media server to host a remote tributary conference in data communication with the third communication device; and
      wherein the application server at the data center sub-system is adapted to interface the home conference on the data center media server with the remote tributary conference on the remote data center media server such that the first communication device, the second communication device, and the third communication device are in data communication with one another.

19. The conferencing system of claim 16, further comprising:
   a remote data center sub-system in a different country than the data center sub-system, the remote data center sub-system comprising:
      a remote gateway to receive a third call initiated by a non-enterprise international caller, the non-enterprise international caller using a third communication device to initiate the third call;
      a remote data center media server to host a remote tributary conference in data communication with the third communication device;
      a remote application server to establish data communication between the remote gateway and the remote data center media server such that the third communication device is in data communication with the remote data center media server, the remote application server also adapted to initiate routing of the third call to the application server at the data center sub-system; and
      wherein the application server at the data center sub-system is adapted to interface the home conference on the data center media server with the remote tributary conference on the remote data center media server such that the first communication device, the second communication device, and the third communication device are in data communication with one another.

* * * * *